(12) United States Patent
Rebne

(10) Patent No.: US 6,702,155 B1
(45) Date of Patent: Mar. 9, 2004

(54) METERED DOSE DISPENSER

(75) Inventor: Thomas M. Rebne, Woodstock, GA (US)

(73) Assignee: Solvay Pharmaceuticals, Inc., Marietta, CA (US)

( * ) Notice: Subject to any disclaimer, the term of this patent is extended or adjusted under 35 U.S.C. 154(b) by 0 days.

(21) Appl. No.: 09/954,010

(22) Filed: Sep. 18, 2001

(51) Int. Cl.[7] .............................................. G01F 11/06
(52) U.S. Cl. ........................ 222/207; 222/219; 222/250
(58) Field of Search ................................. 222/207, 212, 222/216, 217, 218, 219, 249, 250, 363, 389, 444

(56) References Cited

U.S. PATENT DOCUMENTS

| | | | | |
|---|---|---|---|---|
| 3,388,839 A | * | 6/1968 | Frydenberg | 222/219 |
| 3,797,711 A | * | 3/1974 | Bowerman | 222/219 |
| 4,416,397 A | | 11/1983 | Brown | 222/219 |
| 4,875,603 A | | 10/1989 | Weinstein | 222/205 |
| 5,028,080 A | * | 7/1991 | Dennany, Jr. | 285/308 |
| 5,456,298 A | * | 10/1995 | Tennis | 141/156 |
| 5,509,757 A | | 4/1996 | Gillette | 222/1 |
| 5,687,878 A | | 11/1997 | Smith et al. | 222/96 |

OTHER PUBLICATIONS

Ricci, Lauren, "Wrongly Exposed", Apr. 2001, p.p. 1–4, ABCNEWS.com: Estrogen Cream Generated Breasts in Boys.

Micromedex, Inc., Estrogens (Vaginal), Apr. 7, 2001, MayoClinic.com, p.p. 1–10.

* cited by examiner

Primary Examiner—Gene Mancene
Assistant Examiner—Patrick Buechner
(74) Attorney, Agent, or Firm—Dorsey & Whitney LLP

(57) ABSTRACT

An apparatus and method of delivering adjustable metered doses of a composition from a squeezable container. An embodiment of the apparatus is a metered dose dispenser including a body that includes an inlet channel with a first opening, an outlet channel with a second opening, and a dosing wheel seat. The dosing wheel seat is a cavity defined by the body. The dosing wheel seat communicates with the inlet channel, via the first opening, and with the outlet channel, via the second opening. The metered dose dispenser also includes a removable, rotatable dosing wheel is situated within the dosing wheel seat when the metered dose dispenser is in use. The dosing wheel includes a dosing channel, which may be aligned with the inlet channel and the outlet channel. A plunger is movably situated in the dosing channel, the plunger does not fit through either the first or second opening.

13 Claims, 17 Drawing Sheets

METERED DOSE DISPENSER

FIELD OF THE INVENTION

The present invention relates to dispensers for delivering doses of compositions. In particular, the invention relates to dispensers for the delivery of metered doses of compositions from a squeezable container.

DESCRIPTION OF RELATED ART

The present invention is especially useful for delivering accurate doses of prescription or non-prescription medications that are supplied in tubes or other squeezable containers. For example, the invention includes but is not limited to, the delivery of accurate and consistent doses of estrogen creams. Estrogen creams are commonly used by women to treat vulvar atrophy, atrophic vaginitis, atrophic urethritis, and other postmenopausal conditions. When used on the skin or vagina, most estrogens are absorbed into the bloodstream and cause some of the same therapeutic effects as when they are taken orally. Side effects of estrogen creams include breast pain, itching of the vagina, enlarged breasts, headache, nausea, and vaginal discharge. Estrogen creams are available over-the-counter and are supplied in varying concentrations of the estrogen hormone. There is a need for the provision of accurate doses of estrogen cream to achieve the desired therapeutic effect and to prevent side effects. Additionally, there is a need for a delivery system that allows for a dosage change should it be necessary to achieve the desired effect, to prevent or ameliorate side effects, or to accommodate a substituted product with a different estrogen concentration.

U.S. Pat. No. 4,416,397 (Brown) described a sealed delivery system, with an elongated inlet passage and an elongated outlet passage, for dispensing a metered amount of viscous or semi-fluid material from a tube. Brown described a sealed, tamperproof system, which provided for maintenance of product sterility. Sterility is not a requirement for topical skin or vaginal delivery systems. The sealed system in general and as taught by Brown does not allow for disassembly and, therefore, precludes part substitution for dose alteration, replacement for wear and tear, and replacement for soilage. Disassembly also provides for ease of cleaning.

Likewise, the elongated inlet and outlet passages of Brown result in unusable amounts of often expensive medications because the medication is lost to the dead space of the system. Systems with elongated inlet and outlet passages require greater pressure to be applied to the source to cause delivery of product from the outlet passage than is required in a more compact system. An elongated outlet passage results in variable and inaccurate dosing of lower viscosity product because of varying delivery amounts of product from the elongated outlet passage due to variable leakage at time of delivery.

The prior art does not describe a delivery system that dispenses consistent and accurate dosages, and that may be disassembled to allow for alteration of the metered dose amount, cleaning between uses or for storage after use, and part replacement.

SUMMARY OF THE INVENTION

The present invention is directed to a system for the delivery of adjustable metered doses of a composition from a squeezable container. An advantage of the present invention is that it overcomes the disadvantages of the prior art. Another advantage is that the present invention conserves the composition. Another advantage of the present invention is ease of delivery. Additionally, an advantage of the present invention is that the present invention is available for repetitive, remote uses.

These and other advantages of the present invention are achieved by a metered dose dispenser including a body that includes an inlet channel with a first opening, an outlet channel with a second opening, and a dosing wheel seat. The dosing wheel seat is a cavity defined by the body. The dosing wheel seat communicates with the inlet channel, via the first opening, and with the outlet channel, via the second opening. The metered dose dispenser also includes a removable, rotatable dosing wheel that is situated within the dosing wheel seat when the metered dose dispenser is in use. The dosing wheel includes a dosing channel, which may be aligned with the inlet channel and the outlet channel. A plunger is movably situated in the dosing channel, the plunger does not fit through either the first or second opening.

These and other advantages of the present invention are additionally achieved by a metered dose dispenser including a body that includes an inlet channel with a first opening, an outlet channel with a second opening, and a dosing wheel seat. The dosing wheel seat is a cavity defined by the body located between the inlet channel and the outlet channel. The dosing wheel seat communicates with the inlet channel via the first opening and with the outlet channel via the second opening. The metered dose dispenser also includes a rotating dosing wheel that is situated within the dosing wheel seat when the metered dose dispenser is in use. The dosing wheel includes a dosing channel, which has a first end and a second end that are alternatively aligned with the first opening and the second opening. The dosing channel is longer than the inlet channel and the outlet channel. A plunger is movably situated within the dosing channel. The plunger does not fit through either the first opening or the second opening.

These and other advantages of the present invention are also achieved by a kit including a set of interchangeable dosing wheels with varying diameter dosing channels, wherein the dosing wheel may be replaced with any one of the set of interchangeable dosing wheels.

These and other advantages of the present invention are also achieved by a kit including a set of interchangeable plungers of varying lengths, wherein the plunger may be replaced with any one of the set of interchangeable plungers.

BRIEF DESCRIPTION OF DRAWINGS

The invention will be described in detail in the following description of preferred embodiments with reference to the following figures, in which like numbers refer to like items and wherein.

DETAILED DESCRIPTION OF PREFERRED EMBODIMENTS

Figure 1:
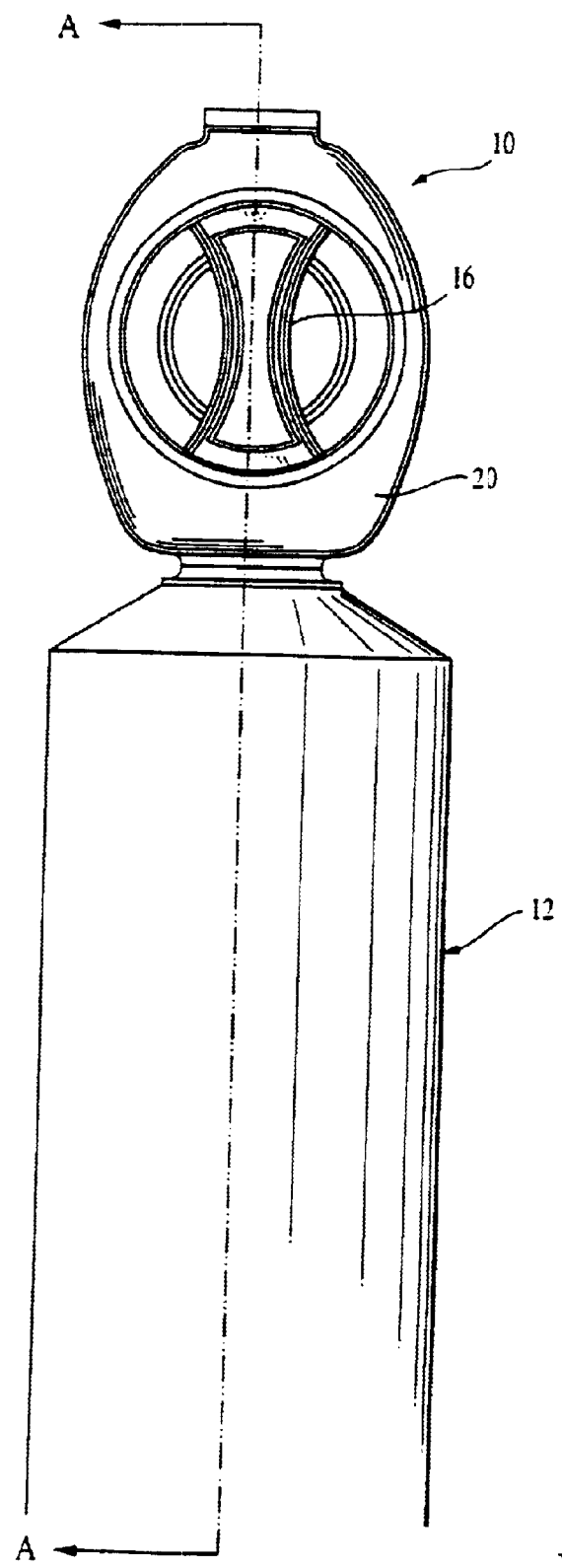
FIG. 1 is a front elevation view showing an embodiment of a metered dose dispenser attached to a squeezable tube.

The present invention is a system for the dispensing of metered amounts of a composition from a squeezable container. A composition is a material, which may be stored in and delivered from a squeezable container. A typical composition is a medication in the form of a cream or ointment. A metered dose dispenser of the present invention is especially useful to accommodate dosage or medication changes.

An embodiment of the metered dose dispenser 10 according to the present invention, as shown in the accompanying FIGS. 1–9, includes a body 14 having inlet 30 and outlet channels 34 with an intervening dosing wheel seat 32. The dosing wheel seat 32 is a cavity defined by the body 14 that communicates with the inlet channel 30 and the outlet channel 34 through a first opening 31 and a second opening 33, respectively. The first opening 31 and the second opening 33 are also defined by the body 14. A removable dosing wheel 16 with a dosing channel 36 is situated within the dosing wheel seat 32. The dosing channel 36 is preferably of a larger diameter than the inlet 30 and outlet channels 34. Within the dosing channel 36 is a movable plunger 18 of a diameter slightly less than the diameter of the dosing channel 36 and greater than the diameter of the first opening 31 and the second opening 33.

With the dosing channel 36 aligned with the inlet 30 and outlet channels 34, a composition from a squeezable container 12 is introduced into the inlet channel 30 following a first squeeze of the container 12. The material passes through the short inlet channel 30 into the dosing channel 36 via the first opening 31. Introduction of the composition causes the plunger 18 to move distally in the dosing channel 36. A metered dose is produced within the dosing channel 36 when the progress of the plunger 18 is halted by contact with the portion of the body 14 defining the second opening 33. At this point, the plunger 18 is situated at the end of the dosing channel 36 opposite the container 12 and opposite the inlet channel 30. The dosing wheel 16 is then rotated so that the plunger 18 is at the inlet channel 30 side of the body 14, adjacent to the first opening 31. A second squeeze on the container 12 again introduces the composition into the inlet channel 30 and then into the dosing channel 36. Distal movement of the plunger 18 resulting from the second squeeze causes the metered dose to be delivered through the short outlet channel 34, via the second opening 33, and out of the metered dose dispenser 10.

Figure 2:
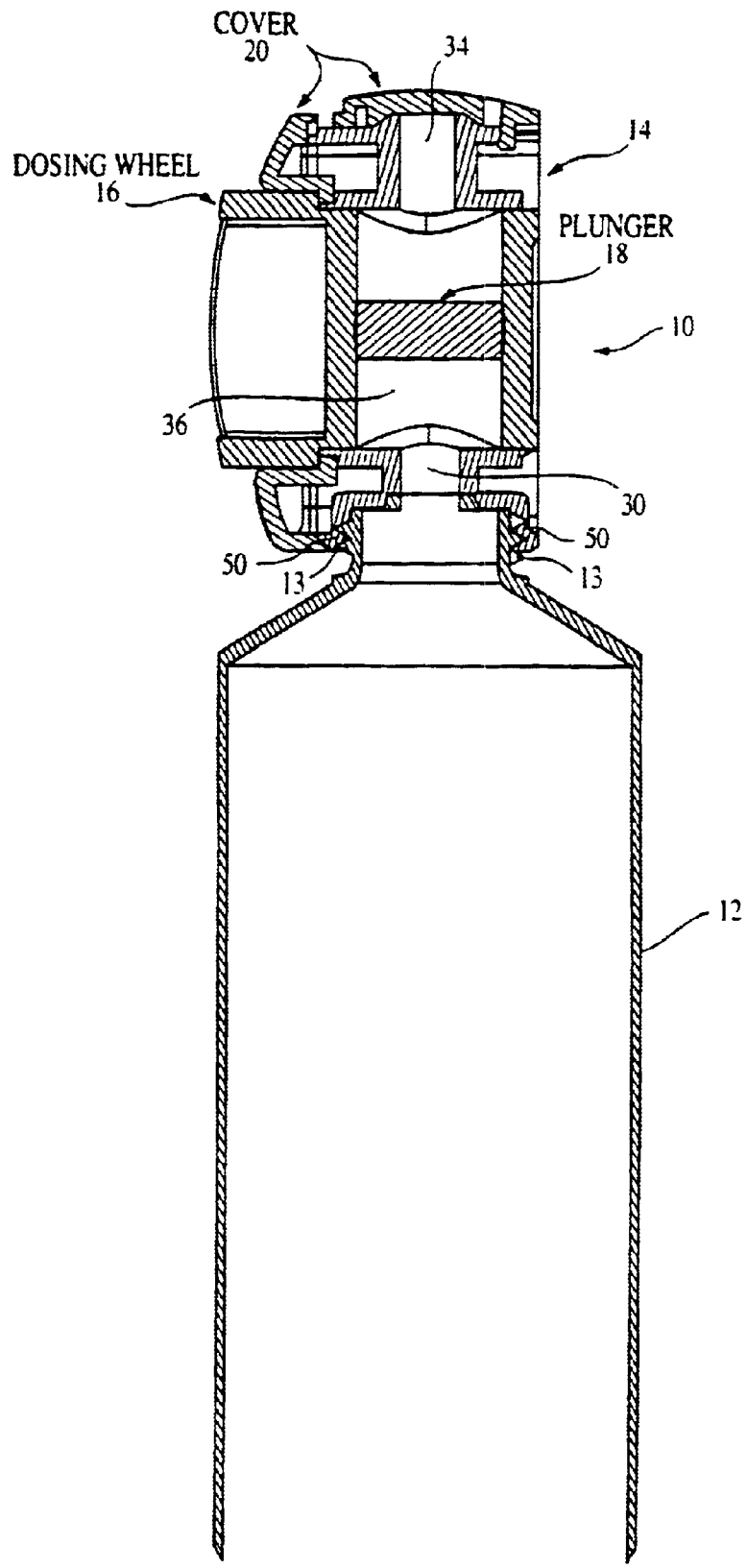
FIG. 2 is a cross-sectional view of the metered dose dispenser taken on line A—A of FIG. 1.

FIGS. 1 and 2 illustrate an embodiment of the present invention. FIGS. 1 and 2 show a metered dose dispenser 10 attached to a squeezable container 12 containing a composition. FIG. 1 is a front elevation view. FIG. 2 is a cross-sectional view taken on line A—A of FIG. 1. The metered dose dispenser 10 includes a body 14, a dosing wheel 16, a plunger 18, and a cover 20. With reference to FIGS. 1–2, the inlet channel 30 receives a composition from the squeezable container 12, the composition is then introduced into the dosing channel 36, which causes the plunger 18 to move towards the outlet channel 34. Composition that had previously been introduced into the dosing channel 36 is dispensed through the outlet channel 34 when the dosing wheel 16 is rotated following the first introduction of composition and when the cover 20 is in the open position (not shown in such position). Components of the embodiment of the metered dose dispenser 10 shown are described in greater detail below with reference to FIGS. 3A–7.

With reference now to FIGS. 3A–D, the body 14 includes a tapered, threaded inlet channel 30. The threads 50 of the inlet channel will accept threads of a threaded squeezable container 12 (not shown in FIGS. 3A–D). Other mechanisms for connecting a container to the metered dose dispenser 10 may be used. The inlet channel 30 is of a length less than the length of the dosing channel (not shown in FIGS. 3A–D), thereby minimizing the force or pressure required to deliver the composition to the dosing channel. The inlet channel 30 of the body 14 communicates with a cavity, the dosing wheel seat 32, defined by the body 14, via a first opening 31. The body 14 also defines the first opening 31. The diameter of the first opening is preferably less than the diameter of the dosing channel.

An outlet channel 34 is directly opposite the inlet channel 30. The outlet channel 34 also communicates with the dosing wheel seat 32, via a second opening 33. The diameter of the second opening is preferably less than the diameter of the dosing channel. The outlet channel 34 is of a length less than the length of the dosing channel to minimize the force or pressure required to dispense the metered dose out of the outlet channel 34 and to insure accurate dosing by preventing variable leakage of low viscosity compositions from the outlet channel 34 during use. The outlet channel 34 opens on a dispensing side of the metered dose dispenser 10. This opening is referred to as the dispensing opening 35 (see FIG. 3B) and is opposite the threaded portion of the inlet channel 30.

Figure 4A:
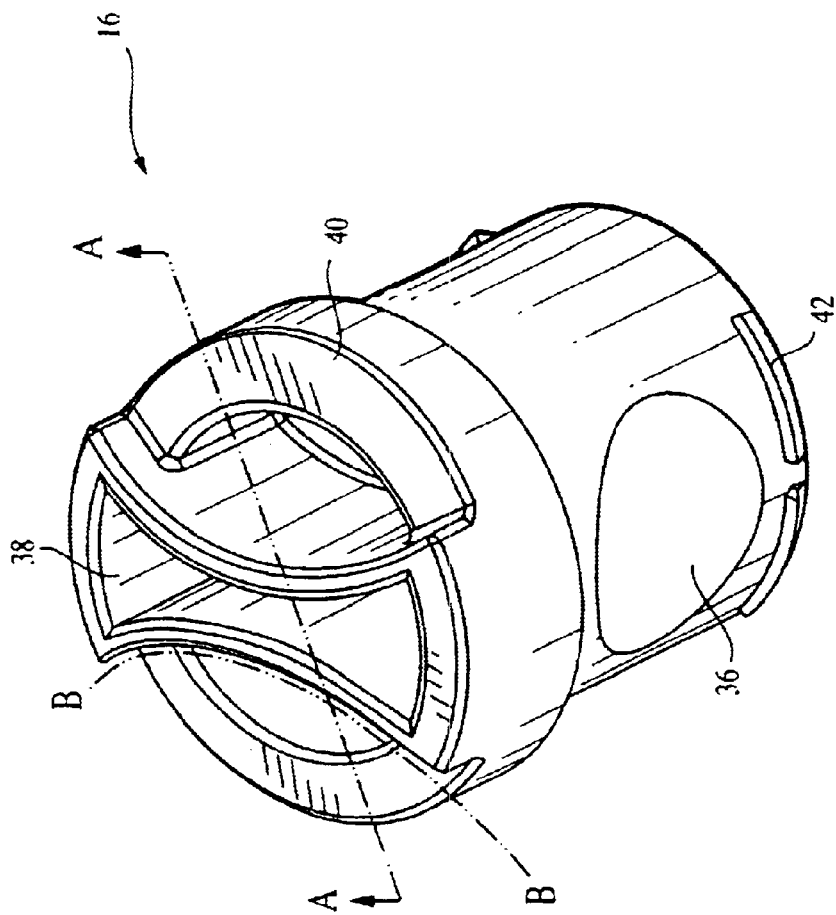
FIG. 4A is a top, oblique view of a dosing wheel of an embodiment of a metered dose dispenser.
Figure 4B:
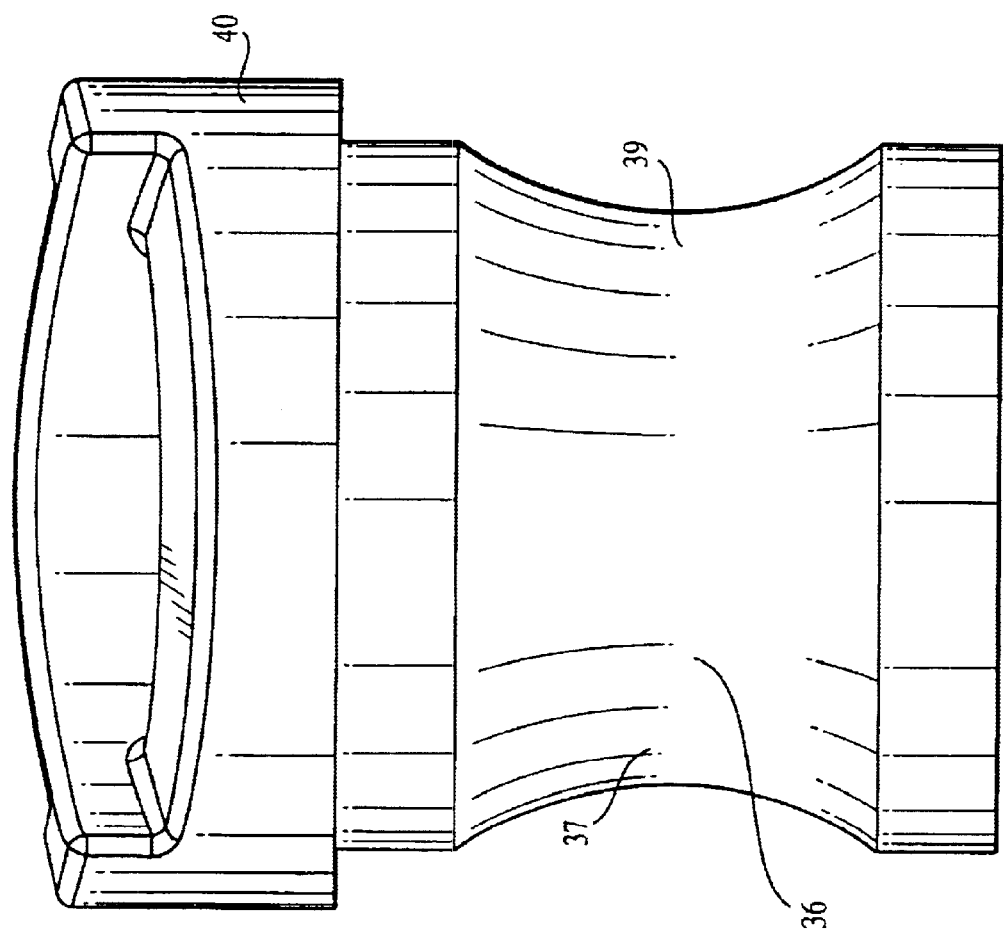
FIG. 4B is a cross-sectional view of the dosing wheel of the metered dose dispenser through line B—B of FIG. 4A.
Figure 4C:
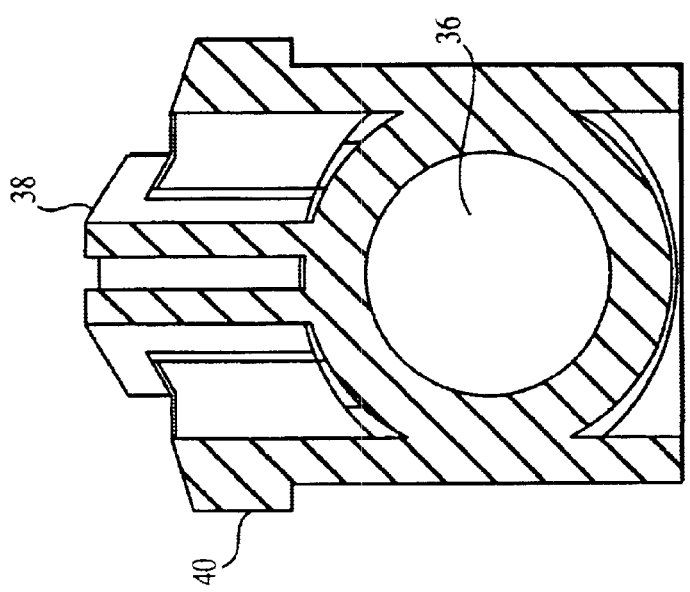
FIG. 4C is a cross-sectional view of the dosing wheel of the metered dose dispenser through line A—A of FIG. 4A.

With reference now to FIGS. 4A–C, the dosing wheel 16 sits within the dosing wheel seat 32 (see FIG. 3B) when the metered dose dispenser 10 is in use. The dosing wheel 16 includes the dosing channel 36, which is preferably of greater diameter than the first opening 31 and the second opening 33. The dosing channel 36 includes a first end 37 and a second end 39. The dosing channel 36 is alignable with the inlet channel 30 and the outlet channel 34 when the dosing wheel 16 is situated within the dosing wheel seat 32. A tab 38 protruding from a top of the dosing wheel 16 facilitates rotation of the dosing wheel 16 by a user. An annular shoulder 40 encircles the edge of the dosing wheel 16 on the top of the dosing wheel 16. The annular shoulder 40 rests on the top edge of the dosing wheel seat 32 when the dosing wheel 16 is seated in the dosing wheel seat 32. Annular flanges 42 partially encircle the bottom edge of the dosing wheel 16 and serve to secure the dosing wheel 16 within the dosing wheel seat 32.

Figure 5A:
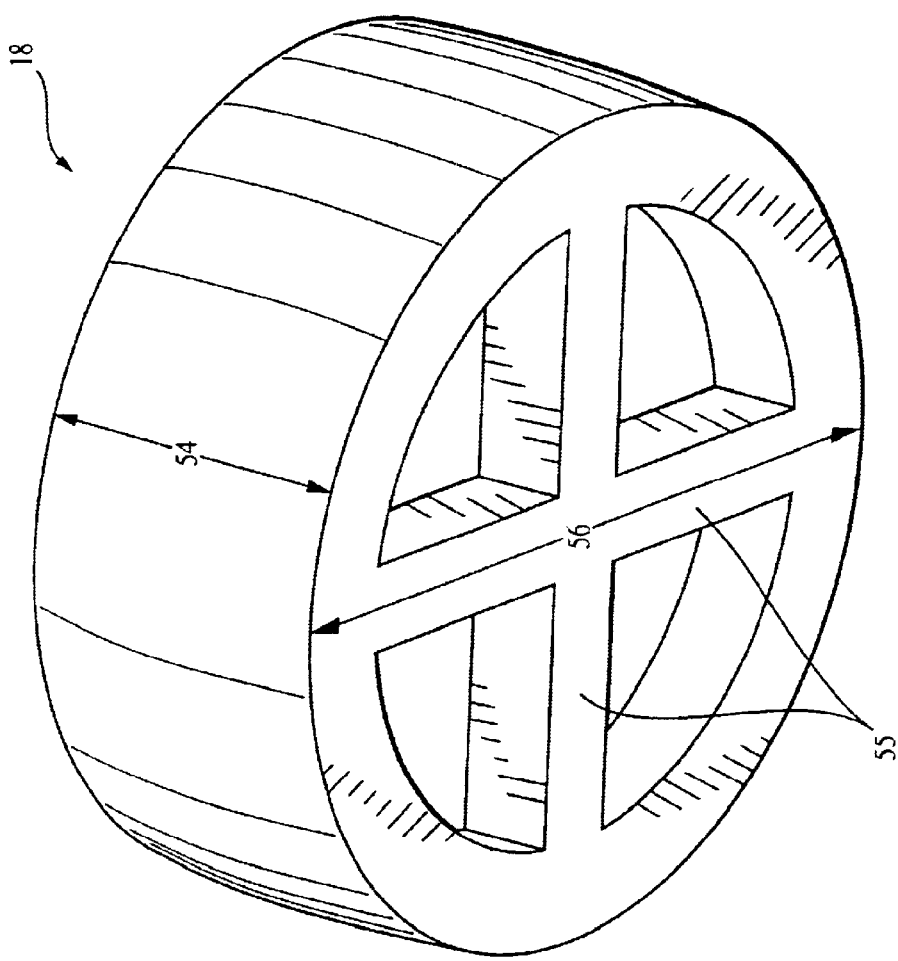
FIGS. 5A–5C are a top oblique view, a top view, and a side view, respectively, of a plunger of an embodiment of a metered dose dispenser.
Figure 5B:
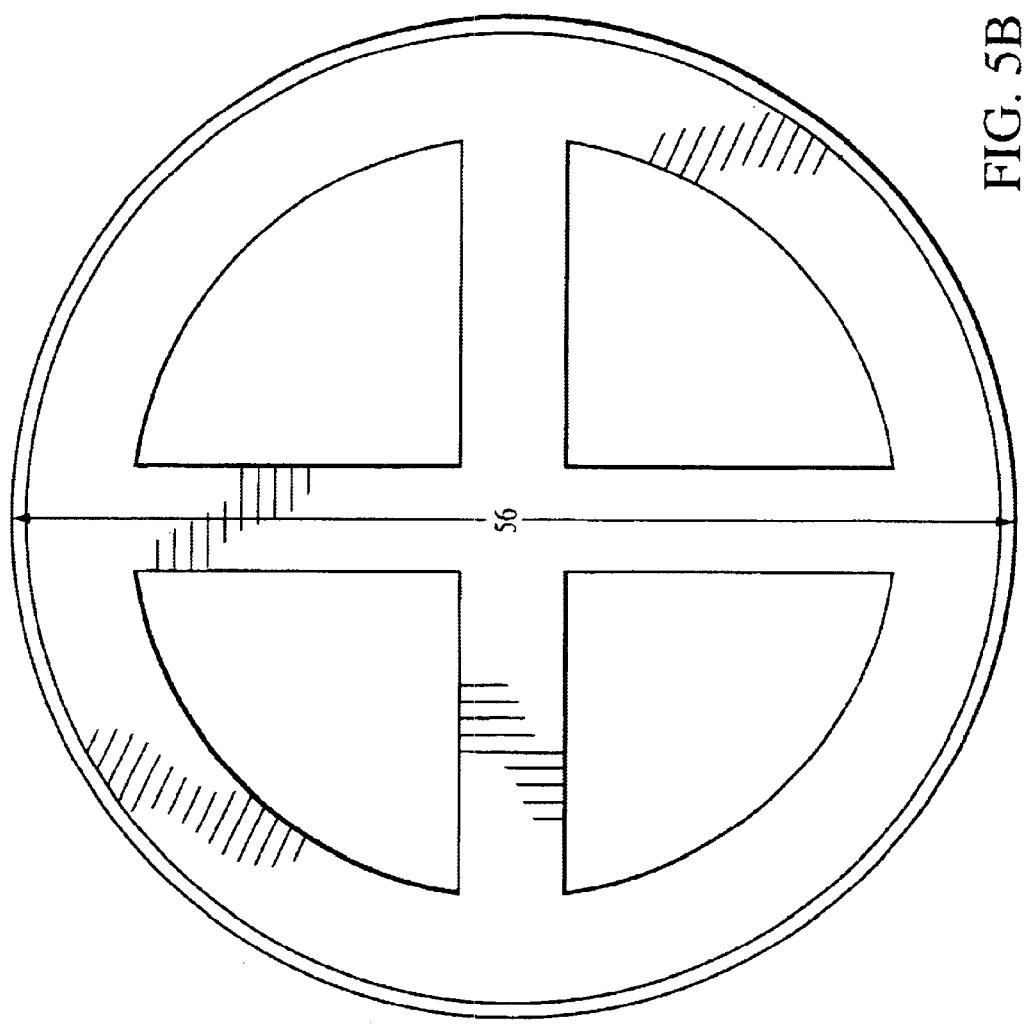
Figure 5C:
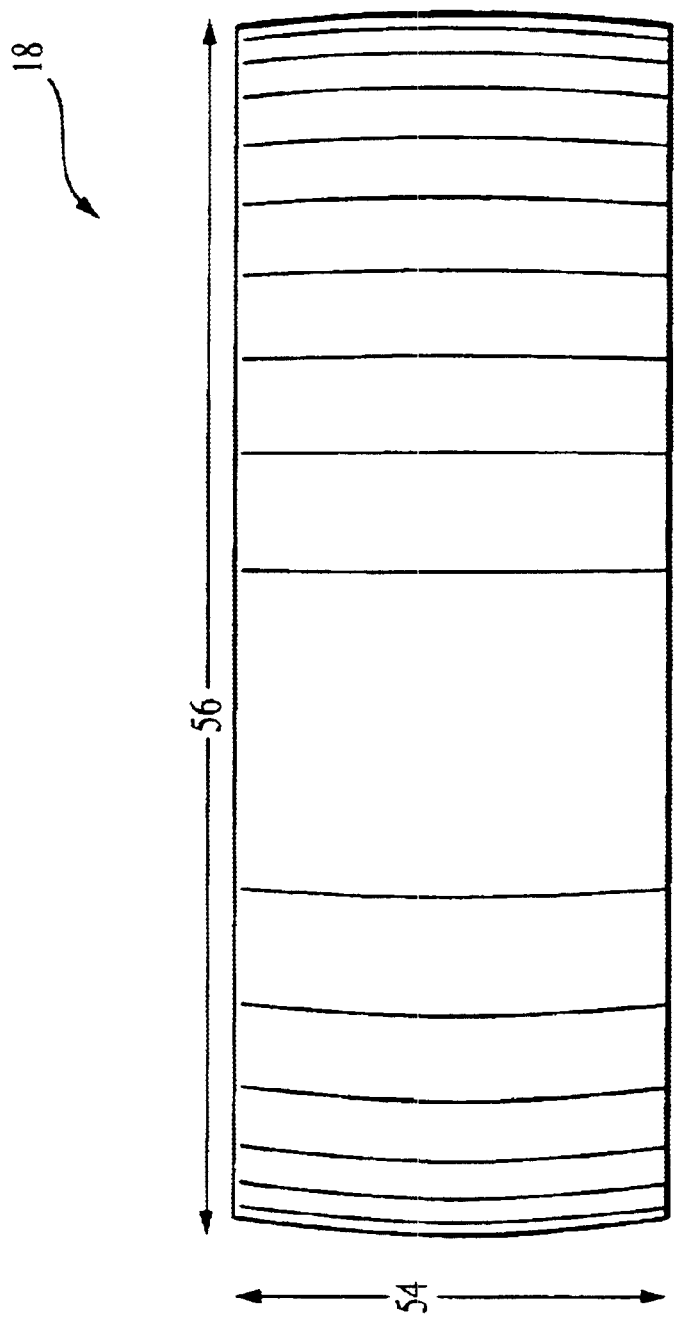

With reference now to FIGS. 5A–C, the plunger 18 is situated within the dosing channel 36 when the metered dose dispenser 10 is in use. The plunger diameter is indicated by the number 56. The plunger length is indicated by the number 54. The plunger 18 is preferably of a slightly smaller diameter than the dosing channel 36 (FIGS. 4A and 4C) and is mobile within the dosing channel 36. The plunger 18 is preferably of a larger diameter than the first opening 31 and the second opening 33. The plunger is preferably non-porous. As shown, in a preferred embodiment, the plunger 18 has crossed ribs 55 to provide additional rigidity to the plunger 18. The plunger 18 without crossed ribs 55 may be used.

Figure 6A:
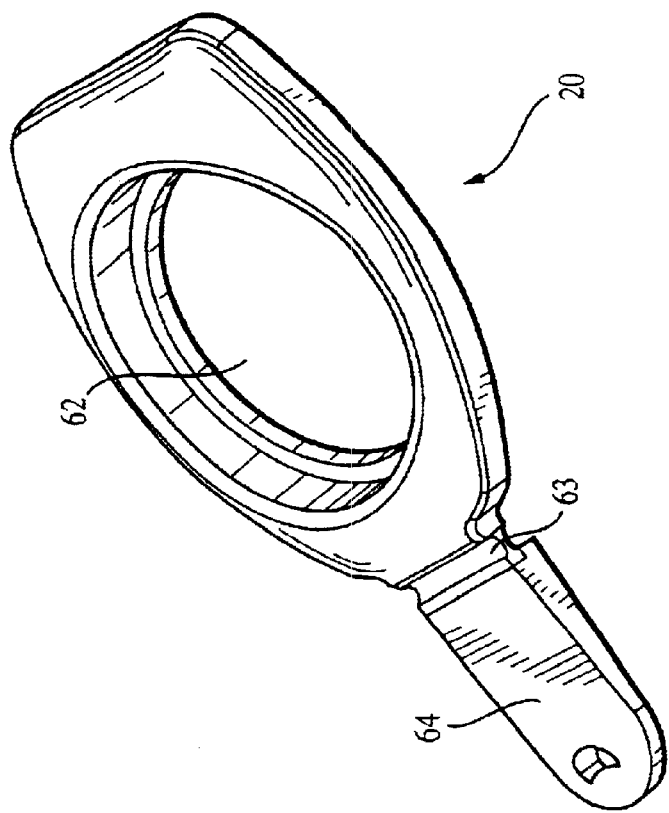
FIGS. 6A–6B are a top, oblique view and a side view, respectively, of a cover of an embodiment of a metered dose dispenser.
Figure 6B:
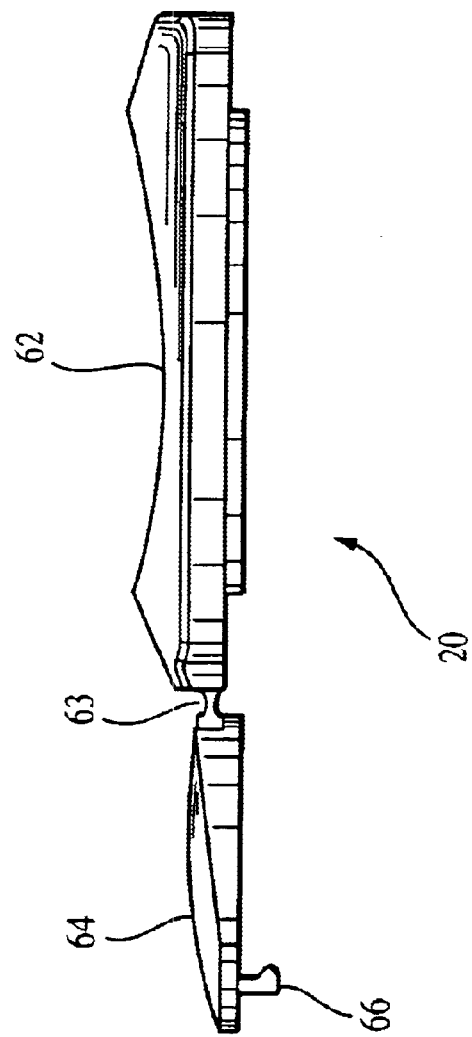
Figure 7:
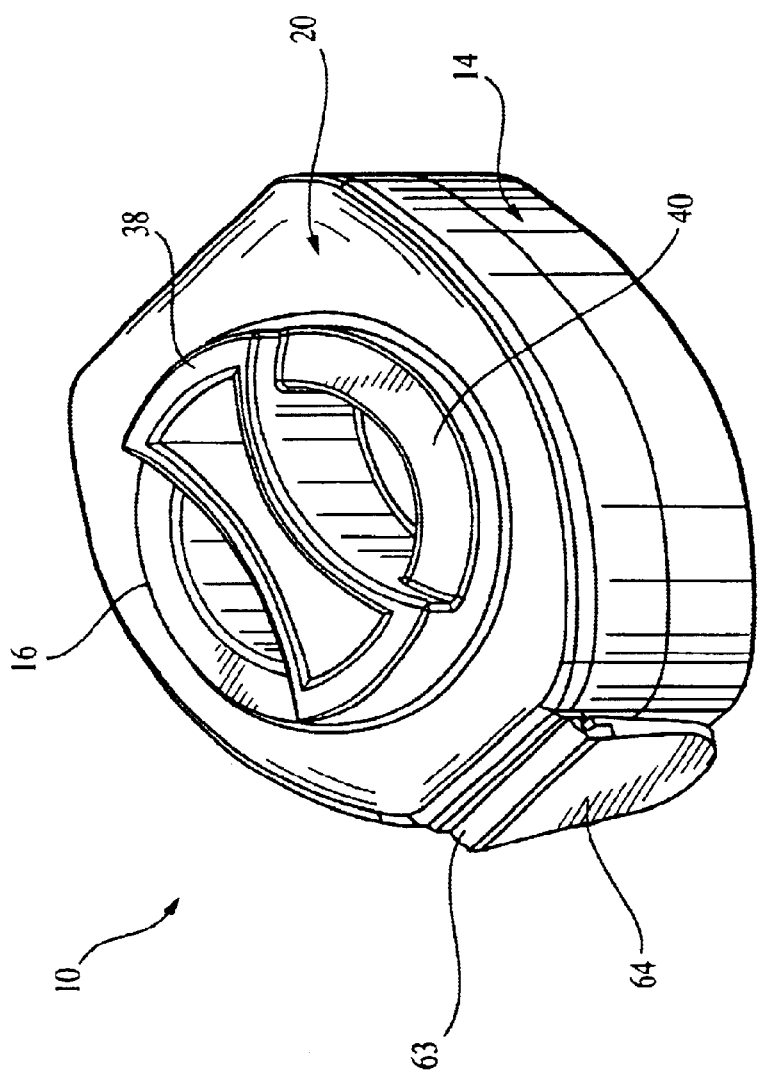
FIG. 7 is a top, oblique view of an embodiment of a metered dose dispenser with a cover.

With reference now to FIGS. 6A–B, the cover 20 articulates with, and is removable from, the top outer edge of the body 14 (see FIGS. 1, 2, 7). The cover 20 has a central circular cut-out 62 (see FIG. 6 A and B) that is preferably slightly greater in diameter than the dosing wheel seat 32 and the dosing wheel 16. The dosing wheel annular shoulder 40 sits within the cover cut-out 62 and is freely rotatable within the cover cut-out 62 (FIGS. 1, 7). The cover 20 also includes a cover flap 64, which folds at a junction 63 to occlude the dispensing opening 35 of the outlet channel 34 (see FIGS. 2, 7). A cover latch 66 secures the cover flap 64 over the outlet channel 34 dispensing opening 35 when the metered dose dispenser 10 is not in use.

With reference now to FIG. 7, the complete metered dose dispenser 10 is shown with the body 14, dosing wheel 16, and cover 20. The tab 38 and annular shoulder 40 of the dosing wheel 16 are shown as they appear through the cut-out 62 (see FIG. 6A) of the cover 20. The cover flap 64 is shown flexed at the junction 63 with the cover latch 66 engaged to the body 14, thereby occluding the dispensing opening 35 (not shown).

Figure 3A:
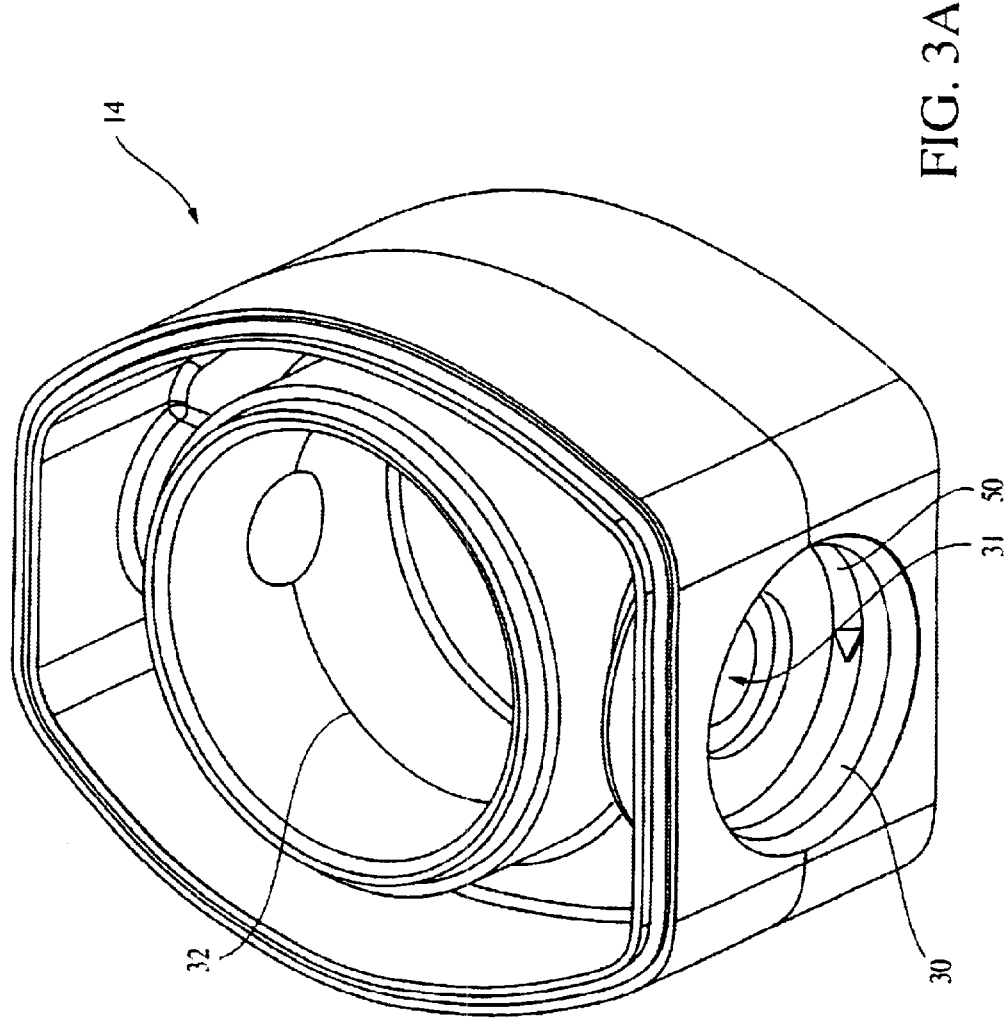
FIG. 3A is a top, oblique view of a body of an embodiment of a metered dose dispenser.
Figure 3B:
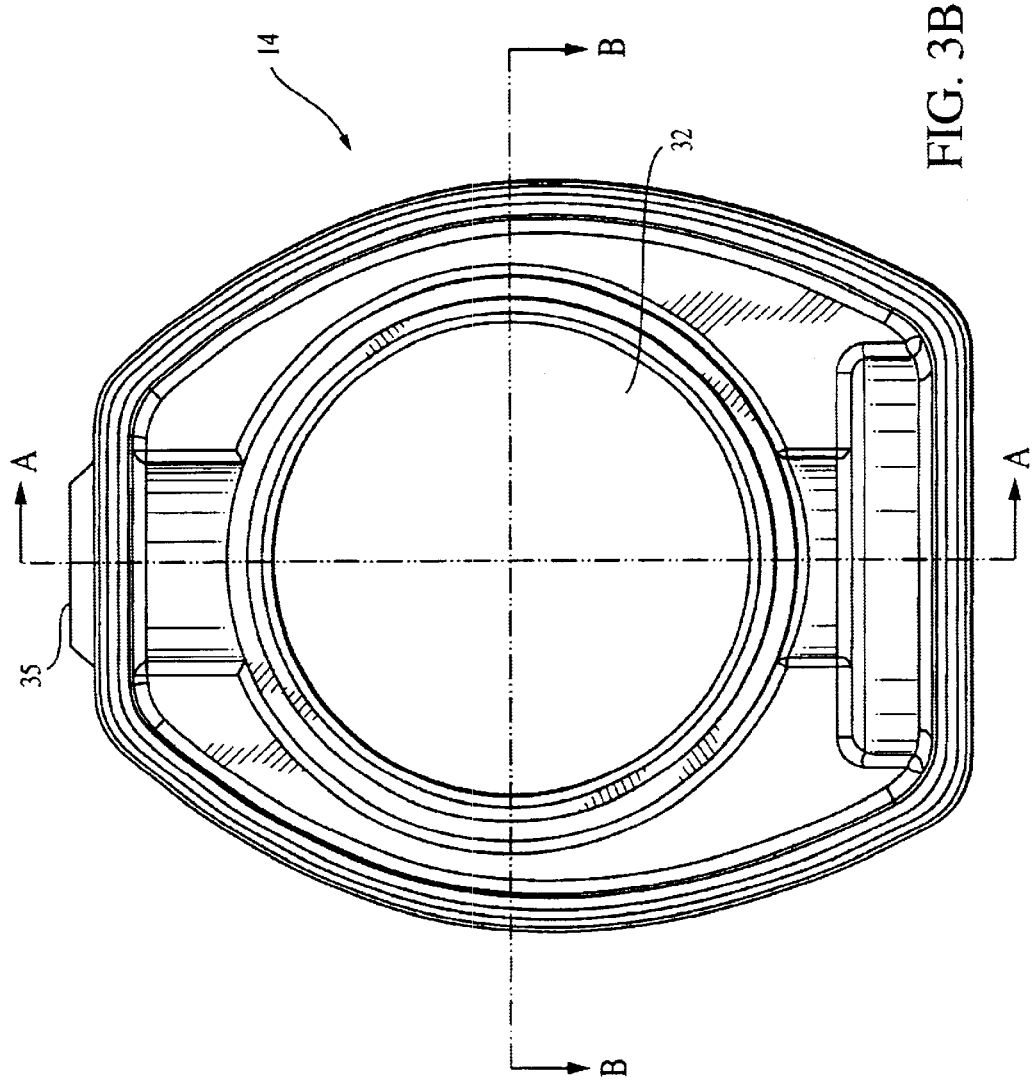
FIG. 3B is a front elevation view of the body of the metered dose dispenser.
Figure 3C:
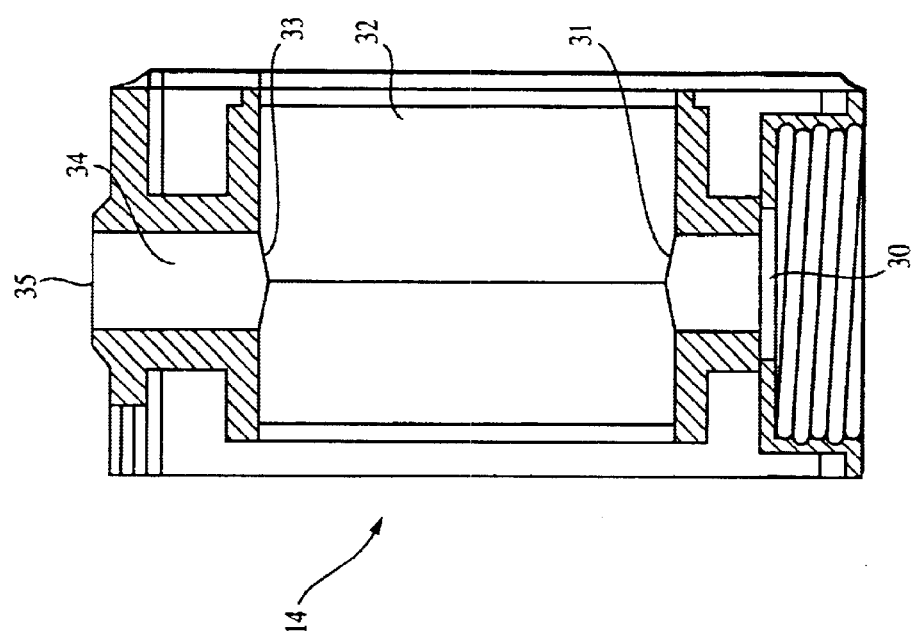
FIG. 3C is a cross-sectional view of the body of the metered dose dispenser through line A—A of FIG. 3B.
Figure 3D:
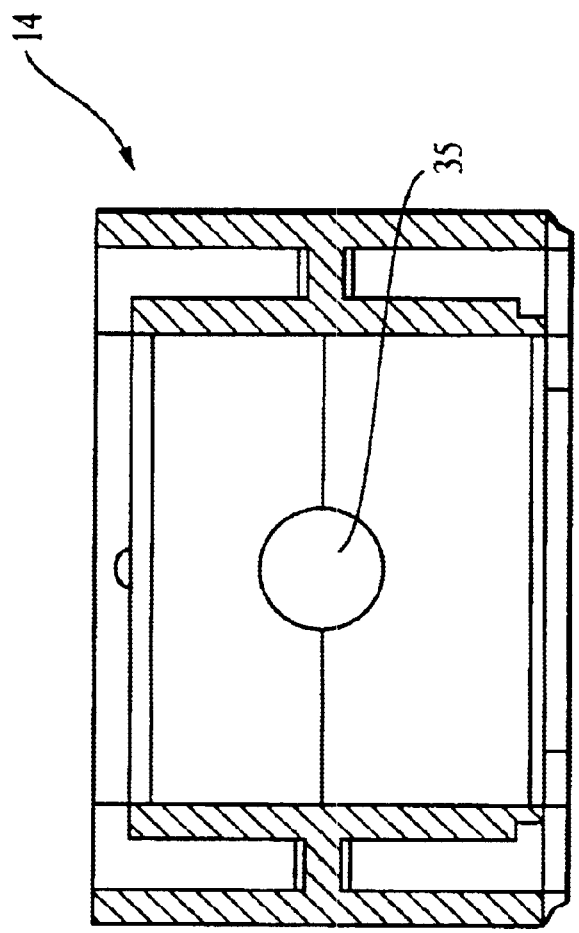
FIG. 3D is a cross-sectional view of the body of the metered dose dispenser through line B—B of FIG. 3B.

In operation, a squeezable container 12 is secured to the metered dose dispenser 10 by a cooperation between the threads 50 of the inlet channel 30 and threads 13 of the squeezable container 12 (see FIGS. 2 and 3A). A first squeeze on the squeezable container 12 delivers the composition into the inlet channel 30. If the first opening 31 of the body 14 and the first end 37 of the dosing channel 32 are abutting and the second opening 33 of the body 14 and the second end 39 of the dosing channel 36 are abutting, the first squeeze propels the composition through the first opening 31 and into the first end 37 of the dosing channel 36. The plunger 18, located within the dosing channel 36, is moved through the dosing channel 36, and away from the squeezable container 12, by the introduction of the composition into the dosing channel 36. The first squeeze is continued or repeated until the plunger 18 is moved to the second end 39 of the dosing channel 36 where the progress of the plunger 18 is halted by contact with the body 14 (i.e., the portion of the body that defines the second opening 33). The plunger 18 is preferably flush with the body 14. At this point, a metered dose is contained within the dosing channel 36. The size of the dosing channel 36 and the plunger 18 determine the size of the metered dose. I.e., the volume of the dosing channel 38 minus the volume of the plunger 18 is the volume of the metered dose.

The dosing wheel 16 is rotated 180 degrees so that the plunger is now at the inlet channel 30 side of the body 14 (i.e., adjacent the portion of the body 14 that defines the first opening 31). The first opening 31 now abuts the second end 39 and the second opening 33 abuts the first end 37. A second squeeze on the squeezable container 12 repeats the process and the metered dose delivered into the dosing channel 36 by the first squeeze is dispensed through the outlet channel 34, via the second opening 33, and out of the metered dose dispenser 10 via the dispensing opening 35.

The components of the metered dose dispenser 10 (including the body 14, the dosing wheel 16, the plunger 18, and the cover 20) may be disassembled from each other and re-assembled. In a preferred embodiment, the metered dose amount can be changed by replacing the plunger 18 with different plungers 18 of varying lengths. A longer plunger 18 will occupy greater space within the dosing channel 36 and the metered dose will be smaller. A shorter plunger 18 will occupy less space in the dosing channel 36 and the metered dose will be larger. An embodiment of the invention thus may comprise a kit including the metered dose dispenser 10 and different plungers 18 of varying lengths (or diameters if different dosing channels are provided).

In another preferred embodiment, the metered dose amount can be changed by replacing the dosing wheel 16, along with a corresponding plunger 18. A dosing wheel 16 with a larger diameter dosing channel 36, will result in a larger metered dose (if the volume of the plunger 18 remains the same). A dosing wheel 16 with a smaller diameter dosing channel 36 will result in a smaller metered dose. Each dosing wheel 16 is accompanied by a plunger 18, which has a diameter slightly smaller than the diameter of the dosing channel 36. Likewise, an embodiment of the invention may comprise a kit including the metered dose dispenser 10 and dosing wheels 16 with varying diameter dosing channels 36 and corresponding plungers 18.

The metered dose dispenser 10 may be disassembled and cleaned, allowing for future re-use. Additionally, the uneconomical replacement of the entire metered dose dispenser 10 for wear and tear, or breakage, of a component is avoided because metered dose dispenser 10 components may be individually replaced.

Figure 8:
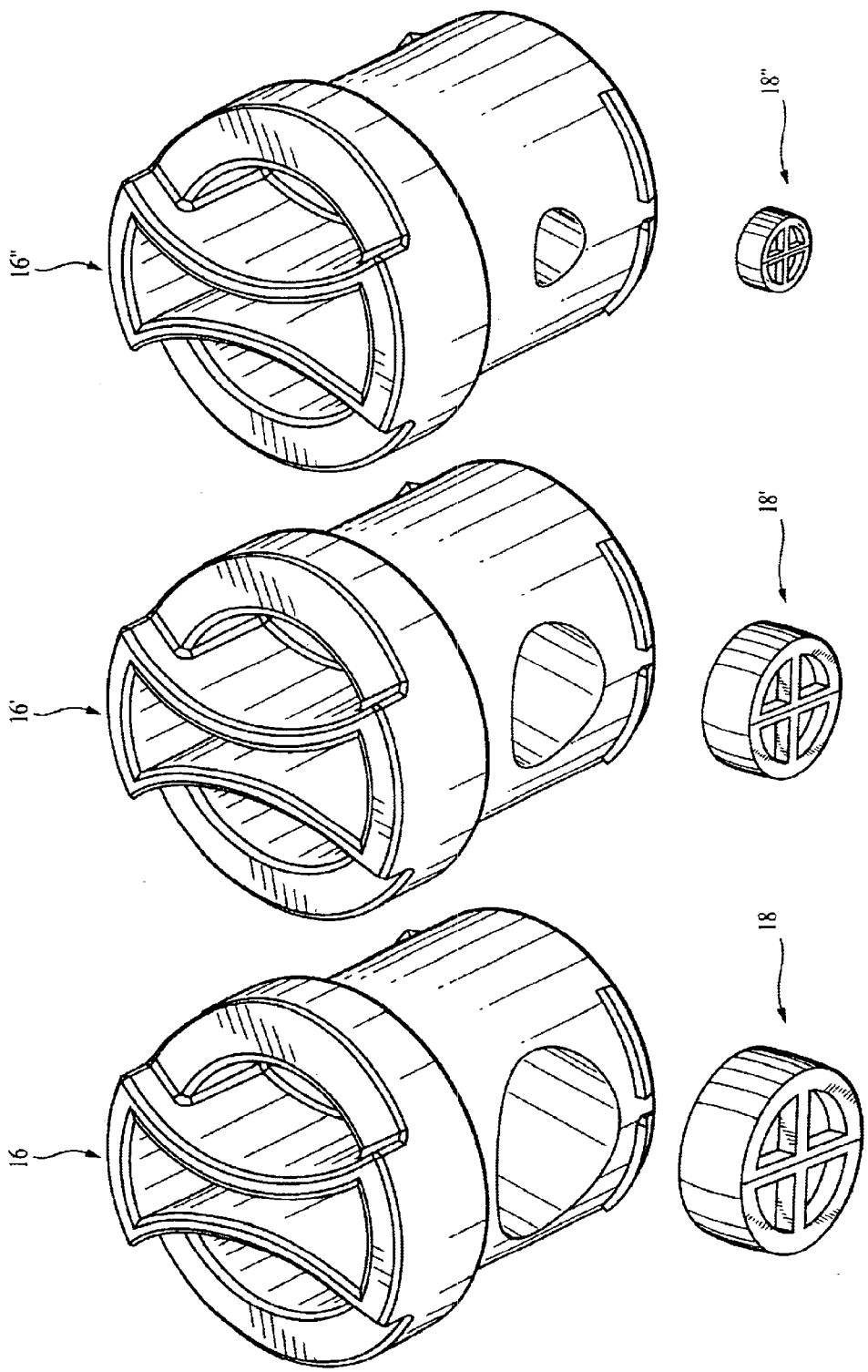
FIG. 8 is a top, oblique view of a set of interchangeable dosing wheels of an embodiment of a metered dose dispenser, with corresponding plungers.

With reference now to FIG. 8, a kit may be supplied including the metered dose dispenser 10 (not shown), a set of interchangeable dosing wheels and plungers of corresponding diameter. The dosing channels of the dosing wheels are of varying diameters. The plungers are of equal length. The set shown (FIG. 8) includes one large diameter dosing wheel 16, a medium diameter dosing wheel 16', and a small diameter dosing wheel 16". A kit may include dosing wheels of a variety of diameters. The kit also includes a set of plungers with diameters that correspond to the diameters of the dosing channels of the dosing wheels. The set shown includes a large diameter plunger 18, a medium diameter plunger 18' and a small diameter plunger 18". Substitution of a large diameter dosing wheel 16 and its corresponding plunger 18 results in a large metered dose. Substitution of a medium diameter dosing wheel 16' and its corresponding plunger 18' results in a medium metered dose. Substitution of a small diameter dosing wheel 16" and its corresponding plunger 18" results in a small metered dose.

Figure 9:
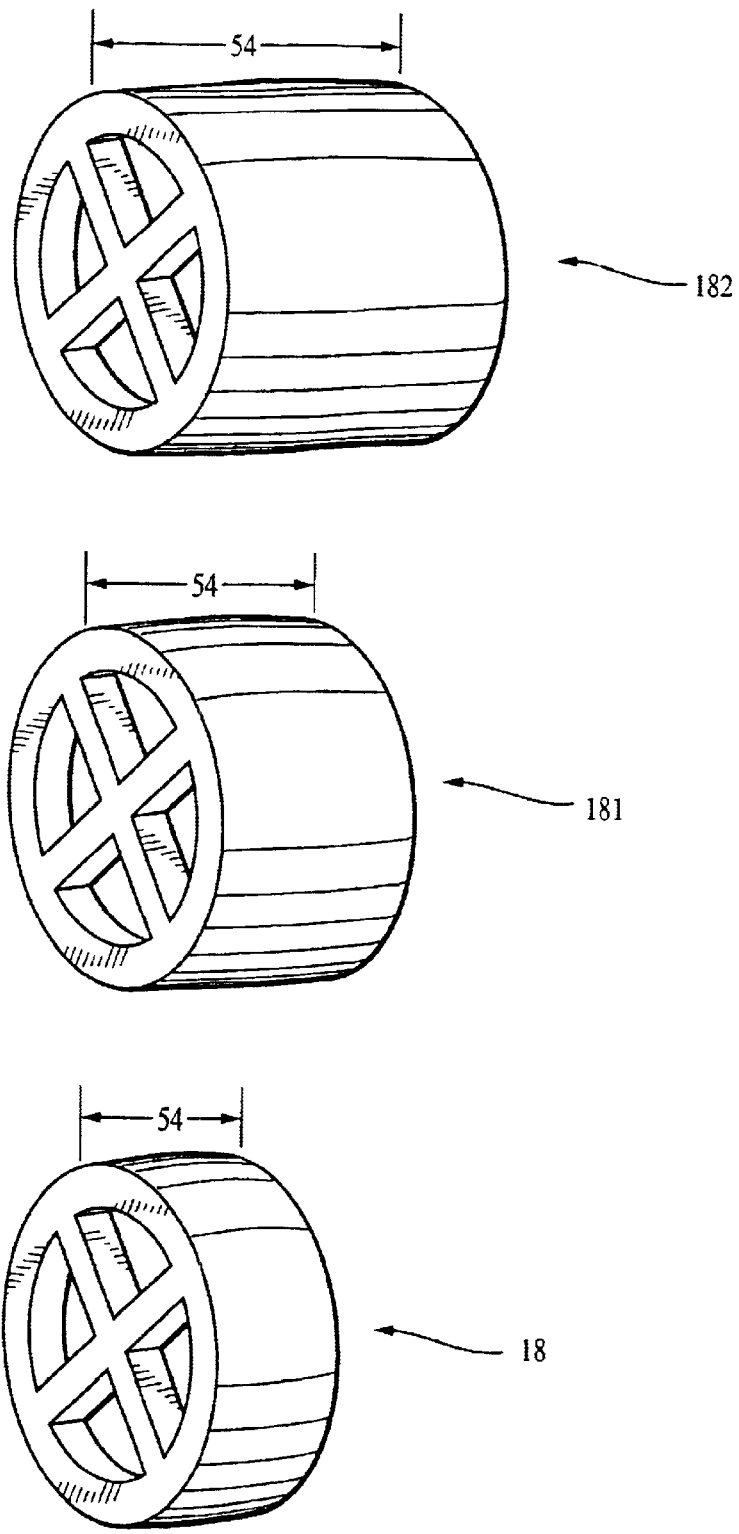
FIG. 9 is a top, oblique view of a set of interchangeable plungers of an embodiment of a metered dose dispenser.

With reference now to FIG. 9, a kit may be supplied including the metered dose dispenser 10 (not shown) and a set of interchangeable plungers. The plungers are of varying lengths 54. The set shown (FIG. 9) includes one short plunger 18, one medium length plunger 181 and one long plunger 182. A kit may include plungers of a variety of lengths. Substitution of a long 182 plunger in the dosing channel 36 (not shown) results in a small metered dose. Substitution of a medium length plunger 181 in the dosing channel 36 (not shown) results in a medium metered dose. Substitution of a short plunger 18 in the dosing channel 36 (not shown) results in a large metered dose.

Having described preferred embodiments of a novel metered dose dispenser (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A metered dose dispenser comprising:
   a body that includes:
      an inlet channel, defined by the body, wherein the inlet channel has a first opening;
      an outlet channel, defined by the body, wherein the outlet channel has a second opening;
      a dosing wheel seat that is a cavity defined by the body, wherein the dosing wheel seat:
         is located between the inlet and outlet channels;
         communicates with the inlet channel via the first opening; and
         communicates with the outlet channel via the second opening; and
      an annular shoulder at an edge of one end of the dosing wheel, wherein the annular shoulder is of greater diameter than the dosing wheel seat; and
   a removable, rotating dosing wheel that is situated within the dosing wheel seat while the metered dose dispenser is in use, wherein the dosing wheel includes:
      a dosing channel, defined by the dosing wheel, including a first end and a second end that are each alternatively aligned with the first opening and the second opening; and
      a plunger, movably situated within the dosing channel, wherein the plunger does not fit through either the first opening or the second opening; and
   a removable cover that includes:
      an outer edge attachable to an outer edge of the body;
      an intermediate edge slightly greater in diameter than the annular shoulder and alignable with the annular shoulder; and
      an inner edge slightly greater in diameter than the dosing wheel seat and alignable with the dosing wheel seat.

2. The metered dose dispenser of claim 1 wherein the inlet channel is threaded.

3. The metered dose dispenser of claim 1, wherein the dosing channel diameter is greater than the diameter of the first opening and the second opening.

4. The metered dose dispenser of claim 1, further comprising a tab protruding from one end of the dosing wheel.

5. The metered dose dispenser of claim 1, further comprising tabs protruding from both ends of the dosing wheel.

6. The metered dose dispenser of claim 1 including one or more annular flange(s) at the edge of one end of the dosing wheel.

7. The metered dose dispenser of claim 1, wherein the plunger diameter is greater than the diameter of the first opening and the second opening.

8. The metered dose dispenser of claim 1, wherein the plunger is removable.

9. A kit comprising the metered dose dispenser of claim 1 and a set of interchangeable dosing wheels with varying diameter dosing channels, wherein the dosing wheel may be replaced with any one of the set of interchangeable dosing wheels.

10. A kit comprising the metered dose dispenser of claim 1 and a set of interchangeable plungers of varying lengths wherein the plunger may be replaced with any one of the set of interchangeable plungers.

11. The metered dose dispenser of claim 1, wherein the removable cover further includes:
   a protruding flap, the flap being capable of flexion at a junction with the cover, the flap extending to overlap the outlet channel upon flexion of the cover, and including a latch to secure the flap to the body.

12. The metered dose dispenser of claim 1, wherein the dosing channel and the plunger define a first dose, and the plunger is replaceable with a longer plunger, wherein the dosing channel and the longer plunger define a second dose that is smaller than the first dose.

13. The metered dose dispenser of claim 1, wherein the plunger is a first plunger that may be replaced with a second plunger of a different length.

* * * * *